United States Patent
Reinhardt et al.

(10) Patent No.: US 10,333,601 B2
(45) Date of Patent: Jun. 25, 2019

(54) TIME- AND/OR FREQUENCY-DOMAIN COORDINATED SCHEDULING AND BEAMFORMING

(71) Applicant: Nokia Solutions and Networks Oy, Espoo (FI)

(72) Inventors: Markus Reinhardt, Neu-Ulm (DE); Hans Kroener, Geislingen (DE); Wolfgang Payer, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 44 days.

(21) Appl. No.: 15/516,213

(22) PCT Filed: Oct. 2, 2014

(86) PCT No.: PCT/EP2014/071139
§ 371 (c)(1),
(2) Date: Mar. 31, 2017

(87) PCT Pub. No.: WO2016/050305
PCT Pub. Date: Apr. 7, 2016

(65) Prior Publication Data
US 2017/0250747 A1    Aug. 31, 2017

(51) Int. Cl.
*H04B 7/06*    (2006.01)
*H04L 1/00*    (2006.01)
(Continued)

(52) U.S. Cl.
CPC ............ *H04B 7/0617* (2013.01); *H04B 7/06* (2013.01); *H04B 7/0619* (2013.01); *H04L 1/00* (2013.01);
(Continued)

(58) Field of Classification Search
CPC ...... H04B 7/0617; H04B 7/0619; H04B 7/06; H04L 1/00; H04W 72/085;
(Continued)

(56) References Cited

U.S. PATENT DOCUMENTS 6,999,795 B2 *  2/2006  Chitrapu ............... H01Q 1/246
                                                    455/562.1
7,333,835 B2 *  2/2008  Nagaraj ................ H01Q 1/246
                                                    342/154
(Continued)

FOREIGN PATENT DOCUMENTS

EP    0 876 074 A1   11/1998
EP    2 120 364 A1   11/2009
(Continued)

OTHER PUBLICATIONS

3GPP TS 36.213 V12.3.0, "3rd Generation Partnership Project; Technical Specification Group Radio Access Network; Evolved Universal Terrestrial Radio Access (E-UTRA); Physical layer procedures (Release 12)", Sep. 2014, 212 pgs.
(Continued)

*Primary Examiner* — Man U Phan
(74) *Attorney, Agent, or Firm* — Harrington & Smith

(57) ABSTRACT

It is provided a method, including coupling respective portions of a transmission resource to fixed beams in a 1:1 relationship such that the portions coupled to different fixed beams do not overlap, wherein the transmission resource is foreseen for transmission by the cell, each of the fixed beams is defined by a fixed beam weight vector, and a number of the fixed beams is predefined and equal to or larger than 2; allocating one of the fixed beams and the portion of the transmission resource coupled to the one of the fixed beams to a terminal; configuring a transmitting device to transmit
(Continued)

to the terminal in the fixed beam and the portion of the transmission resource allocated to the terminal.

17 Claims, 11 Drawing Sheets

(51) Int. Cl.
    *H04W 72/04*         (2009.01)
    *H04W 72/08*         (2009.01)

(52) U.S. Cl.
    CPC ......... *H04W 72/04* (2013.01); *H04W 72/046* (2013.01); *H04W 72/0446* (2013.01); *H04W 72/082* (2013.01); *H04W 72/085* (2013.01)

(58) Field of Classification Search
    CPC ........... H04W 72/0446; H04W 72/046; H04W 72/082; H04W 72/04
    USPC .......................................................... 370/329
    See application file for complete search history.

(56) References Cited

U.S. PATENT DOCUMENTS

| | | | | |
|---|---|---|---|---|
| 7,400,606 B2* | 7/2008 | Padovani | .............. | H04W 16/12 370/335 |
| 7,657,288 B2* | 2/2010 | Chitrapu | ................ | H01Q 1/246 455/562.1 |
| 8,295,228 B2* | 10/2012 | Tangemann | ......... | H04B 7/0408 370/328 |
| 8,320,339 B2* | 11/2012 | Dong | ................... | H04B 7/0408 370/203 |
| 8,670,778 B2* | 3/2014 | Si | ........................... | H04W 16/04 370/334 |
| 8,743,755 B2* | 6/2014 | Xiao | .................... | H04B 7/0452 370/310 |
| 9,380,588 B2* | 6/2016 | Zeira | .................... | H04B 7/0408 |
| 9,781,728 B2* | 10/2017 | Jeon | ..................... | H04W 72/082 |
| 2004/0037263 A1 | 2/2004 | Zeira | ............................. | 370/347 |
| 2006/0194548 A1 | 8/2006 | Nagaraj | .......................... | 455/73 |
| 2007/0249402 A1 | 10/2007 | Dong et al. | ................. | 455/562.1 |
| 2009/0286547 A1 | 11/2009 | Tangemann | ................ | 455/452.2 |
| 2010/0046462 A1* | 2/2010 | Uwano | ................ | H04B 7/0408 370/329 |
| 2010/0081439 A1 | 4/2010 | Sie et al. | | |
| 2012/0020316 A1 | 1/2012 | Dong et al. | .................... | 370/329 |

FOREIGN PATENT DOCUMENTS

| | | |
|---|---|---|
| KR | 20080058480 A | 6/2008 |
| KR | 101105012 B1 | 1/2012 |
| KR | 101186813 B1 | 10/2012 |
| WO | WO 03/096710 A2 | 11/2003 |
| WO | 2015/180065 A1 | 12/2015 |

OTHER PUBLICATIONS

3GPP TS 36.423 V12.3.0, "3rd Generation Partnership Project; Technical Specification Group Radio Access Network; Evolved Universal Terrestrial Radio Access Network (E-UTRAN); X2 application protocol (X2AP) (Release 12)", Sep. 2014, 153 pgs.

* cited by examiner

TIME- AND/OR FREQUENCY-DOMAIN COORDINATED SCHEDULING AND BEAMFORMING

FIELD OF THE INVENTION

The present invention relates to an apparatus, a method, and a computer program product related to mobile communication. More particularly, the present invention relates to an apparatus, a method, and a computer program product related to coordinated multiple point transmission (CoMP).

BACKGROUND OF THE INVENTION

Abbreviations

3GPP Third Generation Partnership Project
CAC Composite available capacity
CDMA Code Division Multiple Access
CQI Channel quality indicator
CSI Channel State Information
CoMP Coordinated Multiple Point
DL Downlink
DRX Discontinuous reception
EDGE Enhanced Datarate for GSM Evolution
eNB evolved NodeB, LTE (EUTRAN) base station
FD Frequency domain
GBR Guaranteed bit rate
GSM Global System for Mobile Communication
ID Identifier
LTE Long Term Evolution
LTE-A LTE Advanced
MHz Megahertz
MIMO Multiple input multiple output
ms millisecond
Non GBR Non Guaranteed Bit Rate
NW Network
O&M Operation and Maintenance
PDSCH Physical Downlink Shared Channel
PMI Precoding Matrix Indicator
PRB Physical resource block
RA Radio Access
RAN Radio Access Network
RAT Radio Access Technology
RBG Resource block group
Rel Release (e.g. version of a 3GPP standard specification)
RI Rank Indicator
SINR Signal to interference plus noise ratio
TD Time domain
TDD Time Division Duplex
TP Transmission point
TS Technical Specification
TTI Transmission Time Interval
UE User Equipment
UMTS Universal Mobile Telecommunications System
UTRA UMTS Terrestrial Radio Access
UTRAN UTRA network
Wi-Fi Wireless Fidelity, e.g. defined by IEEE802.11 specifications and/or certified by Wi-Fi Alliance Coordinated Multiple Point (CoMP) transmission was initiated in 3GPP in September 2011 for LTE and LTE-A. It is one of the core features of the 3GPP Release 11 standard. In addition it can be also applied for 3GPP release 8 onwards.

For coordinated transmission in the downlink, the signals transmitted from multiple transmission points (such as base stations (e.g. NodeB, eNodeB) or cells of base stations) are coordinated to improve the received strength of the desired signal at the user equipment (UE) and/or to reduce the co-channel interference. With multiple transmit antennas, especially antenna arrays, at a transmission point (TP) there is the possibility to direct the signal to the UEs with a so-called beamforming method which is shown in FIG. 1.

FIG. 1 shows that TPs 101, 102 (represented by antenna towers) of different cells 103, 104 may each direct a beam 105, 106 to a respective terminal 107, 108 within their respective cell 103, 104. The two TPs may be controlled by a same base station 110, shown in the middle between the antenna towers.

Beamforming allows focusing the transmitted power to a specific angular range in elevation and azimuth such that the power is directed to the UE. Thereby, the radiated power outside those angular range limits is reduced leading to reduced received interference in neighboring cells and/or to an improved received signal power at the UE and therefore to an improved signal to noise plus interference ratio at the UE in the own cell. To improve even further the mechanism of interference reduction or receive signal power increase neighboring cells may be coordinated in such a way that the beams generated by neighboring cells do not collide.

There are several publications and papers on coordinated beamforming/coordinated scheduling that are based on coupling of scheduling and beamforming. For example, PCT/CN2014/078631 discloses that a transmission bandwidth may be split into a subband for MIMO and a subband for beamforming, based on interference information. US 2010/081439 discloses that sectors may be added to and removed from a cell depending on the load of the sectors.

SUMMARY OF THE INVENTION

According to a first aspect of the invention, there is provided an apparatus, comprising coupling means adapted to couple respective portions of a transmission resource to fixed beams in a 1:1 relationship such that the portions coupled to different fixed beams do not overlap, wherein the transmission resource is foreseen for transmission by the cell, each of the fixed beams is defined by a fixed beam weight vector, and a number of the fixed beams is predefined and equal to or larger than 2; allocating means adapted to allocate one of the fixed beams and the portion of the transmission resource coupled to the one of the fixed beams to a terminal; configuring means adapted to configure a transmitting device to transmit to the terminal in the fixed beam and the portion of the transmission resource allocated to the terminal.

The coupling means may be adapted to couple the portions of the transmission resource and fixed beams based on a received information about neighbor portions of the transmission resource coupled to neighbor fixed beams of a neighboring cell such that mutual interference with the neighboring cell is minimized.

The apparatus may further comprise informing means adapted to inform a control device about the fixed beams and their coupled portions of the transmission resource.

The control device may be comprised by one of an operation and maintenance center and a base station not comprising the apparatus.

The transmission resource may be a transmission bandwidth and the portion may be a subband; and/or the transmission resource may be a transmission time frame and the portion may be a subframe.

The apparatus may further comprise first portion defining means adapted to define the respective portions of the transmission resource based on load information of the cell and/or load information of a neighbor cell neighbored to the cell and/or load information of the respective fixed beam.

The apparatus may further comprise second portion defining means adapted to define the respective portions of the transmission resource based on a feedback report received from the terminal.

The coupling means may be adapted to couple a largest one of the portions to a middle beam of the fixed beams, wherein at least one of the other fixed beams is spatially located between the middle beam and a border of the cell.

The apparatus may further comprise first time scheduling means adapted to schedule a time for the transmission to the terminal before the allocating means allocates the terminal to the one of the fixed beams.

The apparatus may further comprise second time scheduling means adapted to schedule a time for the transmission to the terminal after the allocating means allocated the terminal to the one of the fixed beams.

The apparatus may further comprise requirement monitoring means adapted to monitor required sizes of the portions of the transmission resource required for the transmission to terminals for each of the fixed beams; comparing means adapted to compare, for each of the fixed beams, the required size with a respective balanced size of the portion; wherein the allocating means may be adapted to allocate a portion of the required size to each of the fixed beams where the required size is equal to or less than the respective balanced size, and to allocate the remaining part of the transmission resource to the fixed beams where the required size is larger than the respective balanced size.

The coupling means may be adapted to couple the respective portion of the transmission resource to the respective fixed beam based on measurement related to interference and/or data rates of UEs.

The apparatus may further comprise third scheduling means adapted to schedule a time for respective transmissions to plural terminals, wherein the allocating means may be adapted to allocate respective fixed beams and coupled portion of the transmission resource to the plural terminals, wherein the coupled portion is the same for each of the plural terminals.

According to a second aspect of the invention, there is provided an apparatus, comprising coupling circuit configured to couple respective portions of a transmission resource to fixed beams in a 1:1 relationship such that the portions coupled to different fixed beams do not overlap, wherein the transmission resource is foreseen for transmission by the cell, each of the fixed beams is defined by a fixed beam weight vector, and a number of the fixed beams is predefined and equal to or larger than 2; allocating circuit configured to allocate one of the fixed beams and the portion of the transmission resource coupled to the one of the fixed beams to a terminal; configuring circuit configured to configure a transmitting device to transmit to the terminal in the fixed beam and the portion of the transmission resource allocated to the terminal.

The coupling circuit may be configured to couple the portions of the transmission resource and fixed beams based on a received information about neighbor portions of the transmission resource coupled to neighbor fixed beams of a neighboring cell such that mutual interference with the neighboring cell is minimized.

The apparatus may further comprise informing circuit configured to inform a control device about the fixed beams and their coupled portions of the transmission resource.

The control device may be comprised by one of an operation and maintenance center and a base station not comprising the apparatus.

The transmission resource may be a transmission bandwidth and the portion may be a subband; and/or the transmission resource may be a transmission time frame and the portion may be a subframe.

The apparatus may further comprise first portion defining circuit configured to define the respective portions of the transmission resource based on load information of the cell and/or load information of a neighbor cell neighbored to the cell and/or load information of the respective fixed beam.

The apparatus may further comprise second portion defining circuit configured to define the respective portions of the transmission resource based on a feedback report received from the terminal.

The coupling circuit may be configured to couple a largest one of the portions to a middle beam of the fixed beams, wherein at least one of the other fixed beams is spatially located between the middle beam and a border of the cell.

The apparatus may further comprise first time scheduling circuit configured to schedule a time for the transmission to the terminal before the allocating circuit allocates the terminal to the one of the fixed beams.

The apparatus may further comprise second time scheduling circuit configured to schedule a time for the transmission to the terminal after the allocating circuit allocated the terminal to the one of the fixed beams.

The apparatus may further comprise requirement monitoring circuit configured to monitor required sizes of the portions of the transmission resource required for the transmission to terminals for each of the fixed beams; comparing circuit configured to compare, for each of the fixed beams, the required size with a respective balanced size of the portion; wherein the allocating circuit may be configured to allocate a portion of the required size to each of the fixed beams where the required size is equal to or less than the respective balanced size, and to allocate the remaining part of the transmission resource to the fixed beams where the required size is larger than the respective balanced size.

The coupling circuit may be configured to couple the respective portion of the transmission resource to the respective fixed beam based on measurement related to interference and/or data rates of UEs.

The apparatus may further comprise third scheduling circuit configured to schedule a time for respective transmissions to plural terminals, wherein the allocating circuit may be configured to allocate respective fixed beams and coupled portion of the transmission resource to the plural terminals, wherein the coupled portion is the same for each of the plural terminals.

According to a third aspect of the invention, there is provided a method, comprising coupling respective portions of a transmission resource to fixed beams in a 1:1 relationship such that the portions coupled to different fixed beams do not overlap, wherein the transmission resource is foreseen for transmission by the cell, each of the fixed beams is defined by a fixed beam weight vector, and a number of the fixed beams is predefined and equal to or larger than 2; allocating one of the fixed beams and the portion of the transmission resource coupled to the one of the fixed beams to a terminal; configuring a transmitting device to transmit to the terminal in the fixed beam and the portion of the transmission resource allocated to the terminal.

The coupling may be adapted to couple the portions of the transmission resource and fixed beams based on a received information about neighbor portions of the transmission resource coupled to neighbor fixed beams of a neighboring cell such that mutual interference with the neighboring cell is minimized.

The method may further comprise informing a control device about the fixed beams and their coupled portions of the transmission resource.

The control device may be comprised by one of an operation and maintenance center and a base station not comprising an apparatus performing the method.

The transmission resource may be a transmission bandwidth and the portion may be a subband; and/or the transmission resource may be a transmission time frame and the portion may be a subframe.

The method may further comprise defining the respective portions of the transmission resource based on load information of the cell and/or load information of a neighbor cell neighbored to the cell and/or load information of the respective fixed beam.

The method may further comprise defining the respective portions of the transmission resource based on a feedback report received from the terminal.

The coupling may be adapted to couple a largest one of the portions to a middle beam of the fixed beams, wherein at least one of the other fixed beams is spatially located between the middle beam and a border of the cell.

The method may further comprise scheduling a time for the transmission to the terminal before the terminal is allocated to the one of the fixed beams.

The method may further comprise scheduling a time for the transmission to the terminal after the terminal is allocated to the one of the fixed beams.

The method may further comprise monitoring required sizes of the portions of the transmission resource required for the transmission to terminals for each of the fixed beams; comparing, for each of the fixed beams, the required size with a respective balanced size of the portion; wherein the allocating may be adapted to allocate a portion of the required size to each of the fixed beams where the required size is equal to or less than the respective balanced size, and to allocate the remaining part of the transmission resource to the fixed beams where the required size is larger than the respective balanced size.

The coupling may be adapted to couple the respective portion of the transmission resource to the respective fixed beam based on measurement related to interference and/or data rates of UEs.

The method may further comprise scheduling a time for respective transmissions to plural terminals, wherein the allocating may be adapted to allocate respective fixed beams and coupled portion of the transmission resource to the plural terminals, wherein the coupled portion is the same for each of the plural terminals.

The method may be a method of coordinated scheduling and beamforming.

According to a fourth aspect of the invention, there is provided a computer program product comprising a set of instructions which, when executed on an apparatus, is configured to cause the apparatus to carry out any of the methods according to the third aspect. The computer program product may be embodied as a computer-readable medium or directly loadable into a computer.

According to some embodiments of the invention, at least one of the following advantages may be achieved:
 Interference may be reduced such that SINR at UE is improved;
 Collisions of beams from neighboring cells may be avoided or reduced;
 Throughput may be improved;
 Usage of radio resources may be improved;
 Resource allocation may be adapted according to load;
 UE is not affected, hence, the invention may be implemented without standardization;
 the method may require only 3GPP Rel.-8 specific MIMO reporting by the UE; and
 Different levels of fairness may be realized between throughputs transmitted to UEs.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of some embodiments of the present invention which is to be taken in conjunction with the appended drawings, wherein.

DETAILED DESCRIPTION OF CERTAIN EMBODIMENTS

Figure 1:
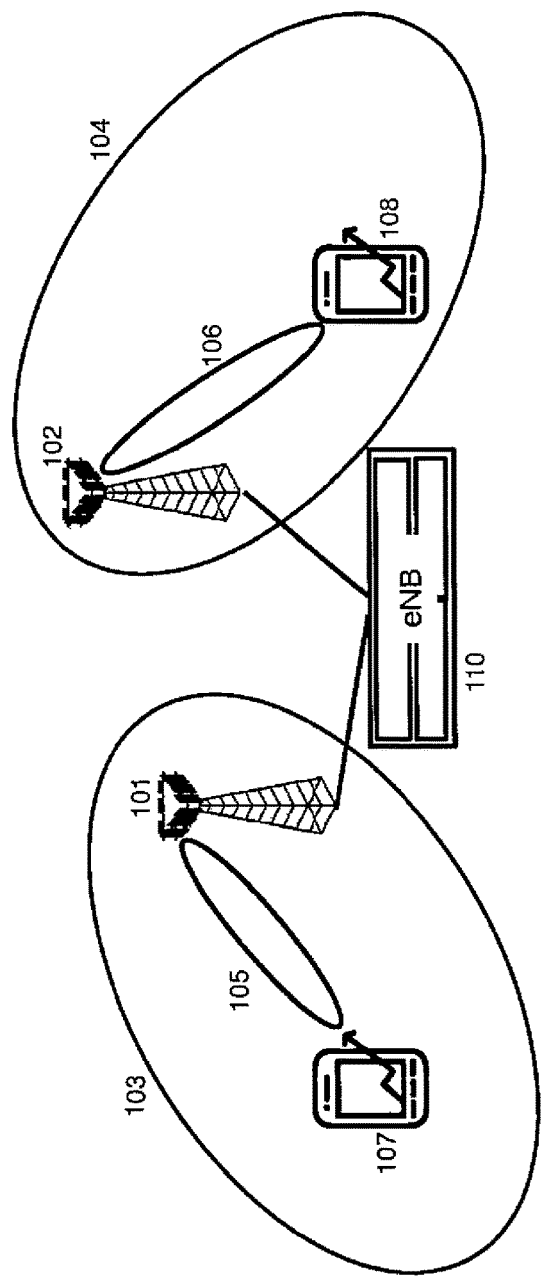
FIG. 1 shows principles of beamforming and beam coordination in a cellular network with two cells.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Some embodiments of the invention specifically relate to an improved transmission of the PDSCH channel via coordinated beamforming together with specific adaptive time and frequency domain scheduling methods.

According to some embodiments of the invention, collision of beams generated by neighboring cells is avoided by the coupling of beamforming with specific adaptive frequency and/or time domain scheduling methods.

Namely, according to some embodiments of the invention, adaptive time-domain (TD) and frequency-domain (FD) scheduling and beamforming are combined in a coordinated way as follows:

a) A cell in a cellular network is divided into M (M: integer, M>1, for example M=3) subsectors by M predefined beams (hereinafter also named fixed beams or just beams for simplicity). The M fixed beams may be defined by a fixed beam weight vector. There is a 1:1 relationship between a beam (a beam shape) and the corresponding antenna weight vector. For example, if there are A (A=2, 3, 4, . . . ) antennas in the cell, each of the M fixed beams is defined by a vector consisting of A antenna weights. The beam vectors might be restricted by a given code book.

b) The total transmission bandwidth of the cell is divided into M subbands of equal size or different size.

c) Each of the M fixed beams (e.g. three fixed beams) in a cell is coupled with one of the M subbands such that users receive their transmission in a certain fixed beam may only use PRBs from the coupled subband.

d) The coupling of beams and subbands in neighboring cells may be done in such a way that the mutual interference is minimized by selecting beams in equal subbands of neighboring cells that are spatially well separated.

e) The selection of the transmission subband for a UE is based on the selection of the relevant fixed beam in DL. For example, the relevant fixed beam may be decided either on the reported pre-coding matrix indicators (PMI) that are reported by the UE when the cell is configured for MIMO transmission. Optionally, in addition, the relevant fixed beam may be decided based on the reported CSI or based on measurements of the UL signals of the UE to detect in which spatial direction the signals are coming, which may be used e.g. in a TDD system. Note that CSI is a superset of CQI and comprises CQI (CSI comprises CQI, PMI and RI, for example). Different options for beam selection may be used.

f) The allocation of PRB resources to beams may be static or dynamic. Several options for the implementation are described below.

g) The allocation of PRB resources per beam may be adjusted network wide or for a coordination area e.g. periodically or event triggered depending on load metrics (for example, if load situation changes significantly). In some embodiments of the invention, a suitable load metric is the traffic load per beam or the composite available capacity (CAC) per beam.

Figure 2:
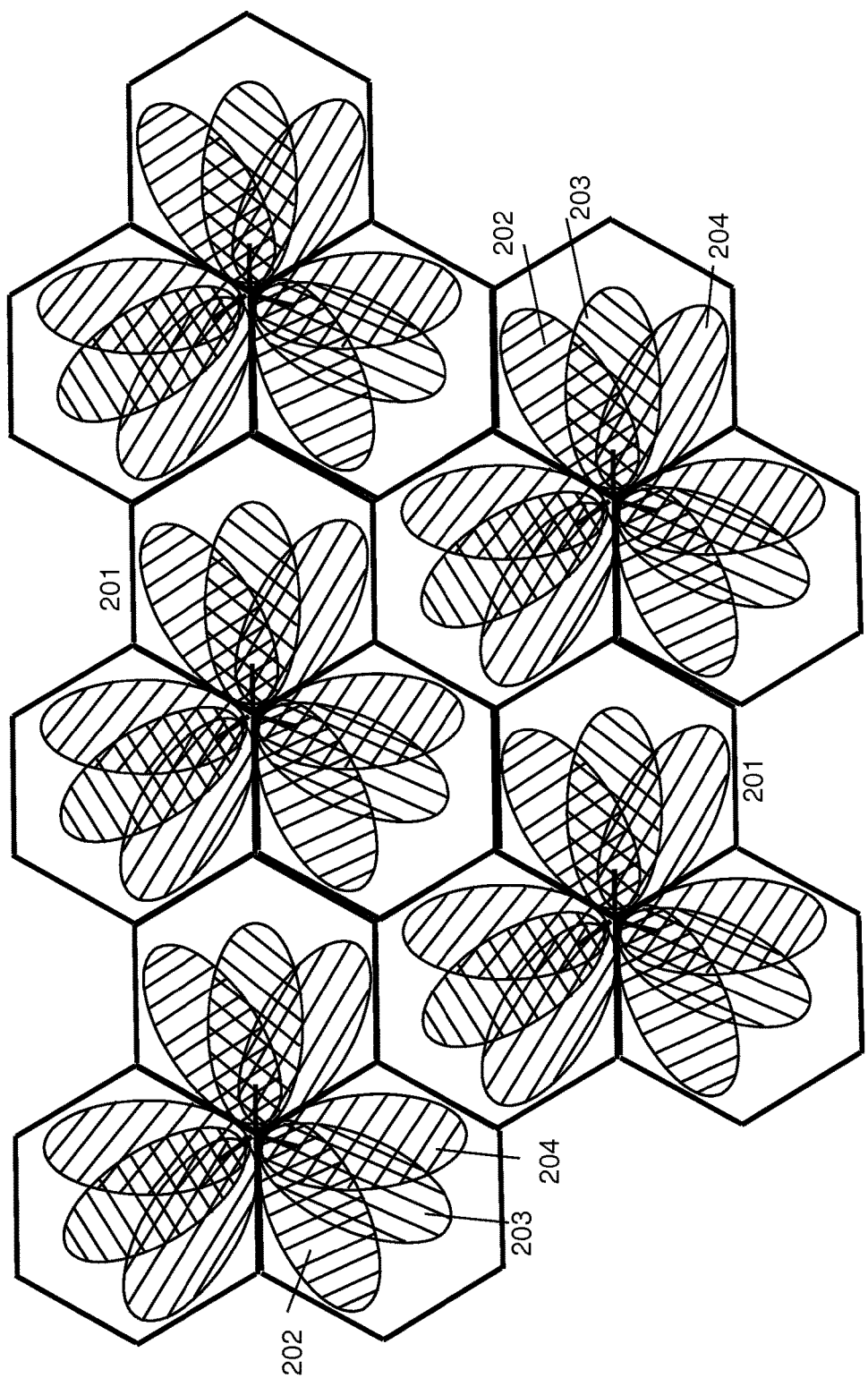
FIG. 2 shows coordinated beams in a network according to an embodiment of the invention.

FIG. 2 shows for the case M=3 schematically the allocation of subbands and fixed beams in a network made up of hexagonal cells 201. Each fixed beam is represented by an ellipse 202, 203, 204. Ellipses with a same hatching (i.e. those with the same reference number) correspond to beams with a same or corresponding allocated frequency subband, wherein a "corresponding frequency subband" means the subbands are allocated around the same center frequency. In this example, each TP serves three cells, which each are divided into M (three) sectors served by the respective fixed beams. In this pattern, most fixed beams coupled to the same subband are spatially well separated such that interference may be minimized. The illustration of FIG. 2 is just an example of an embodiment of the invention and does not preclude other beam patterns.

According to some embodiments of the invention, the size of the frequency bands bundled with a given fixed beam is adaptively changed based on beam specific load information exchanged between neighboring cells such that the cross-interference of beams from neighboring cells is further reduced and the UE throughput maximized, for example. This variant is especially helpful to adapt to spatially inhomogeneous user distributions within cells that may occur in current networks.

Figure 3:
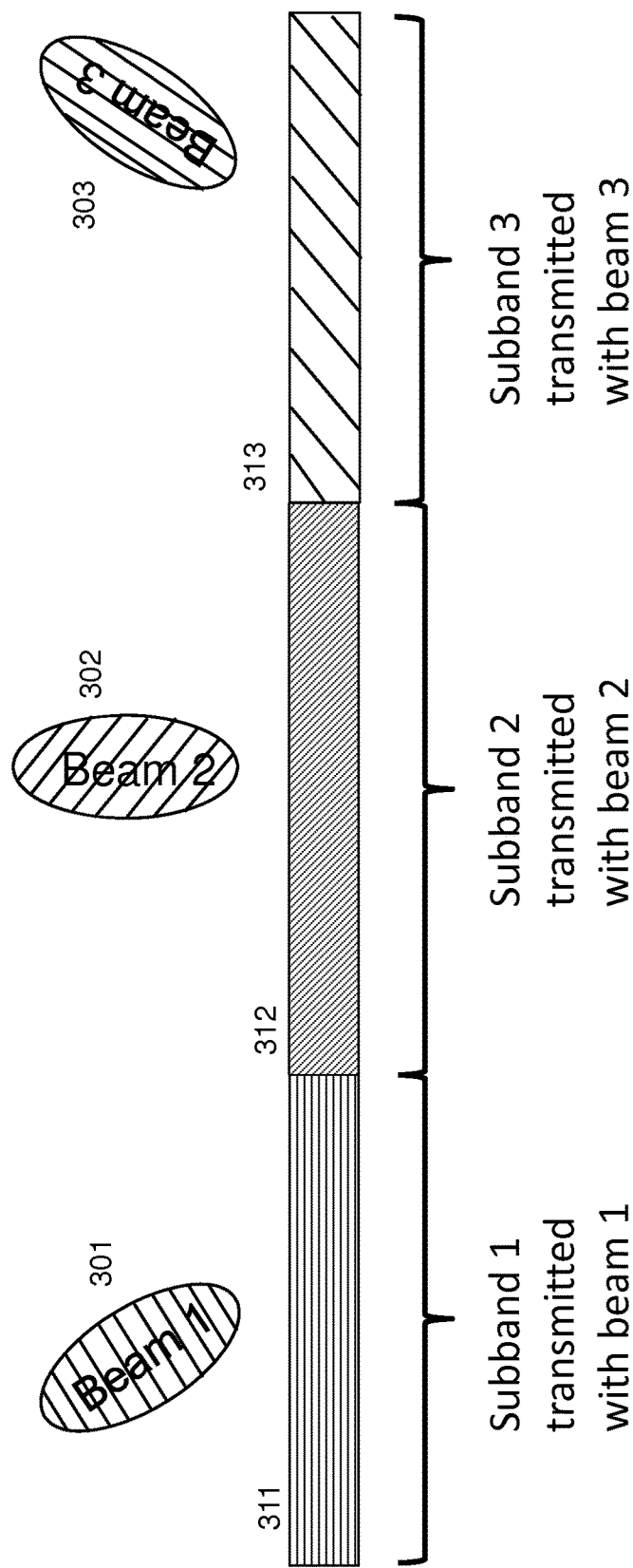
FIG. 3 shows bundling of unequal sized subbands with respective beams according to an embodiment of the invention.

Schematically such an inhomogeneous bundling of subband allocations with beams 301, 302, 303 is shown in FIG. 3. According to this figure, subband 2 (312), which is coupled to fixed beam 2, is considerably broader than subbands 1 (311) and 3 (313) coupled to fixed beams 1 and 3. Even more irregular patterns of resource allocation bundled with beams could result according to some embodiments of the invention.

According to some embodiments of the invention, the allocation and size of the subbands is determined based on one or more feedback reports (e.g. CQI) received from one or more of the terminals.

An affected cell may be equipped with an antenna configuration that allows beamforming. The affected cell may be equipped with a uniform linear antenna array. The columns of the array shall be closely spaced (e.g. ~half of a wavelength) to allow for beamforming. The antenna elements within a column of the antenna array may be cross-polarized elements to enforce the possibility and probability of dual code word transmission with the MIMO transmission scheme.

One advantage of some embodiments of the invention is that in the simple non-adaptive subband case it requires only 3GPP Rel.-8 specific MIMO reporting by the UE to work properly.

In the following, three approaches of the coordinated scheduling in combination with beamforming according to some embodiments of the invention are described at greater detail. It is assumed M=3, however, the approaches may be applied correspondingly to other values of M.

Approach 1:

According to approach 1, the allocation of frequency resources to beams is done in the following way:

Resource allocation between UEs of different beams is separated in frequency domain.

According to some of these embodiments, this separation may be done in a fine granular way due to the fine frequency domain resource grid.

Frequency domain is split into 3 (M) frequency areas of approximately same size where each frequency area is mapped exclusively to UEs using the corresponding one of the three (M) fixed beams.

The frequency areas may have at least a size of 2 RBGs such that frequency selective reports are aligned to the areas; if this causes an imbalance between the frequency areas then at least an alignment to 1 RBG shall be done. An RBG is an aggregation of a number of PRBs, which may be consecutive or not.

If an asymmetric PRB allocation is needed then the middle beam may get a larger allocation (i.e. an allocation of a larger frequency area) since it may have a larger coverage and may be less prone to cause interference in neighbor cells. Here, the term "middle beam" means the fixed beam spatially located in the middle among the fixed beams.

Figure 4:
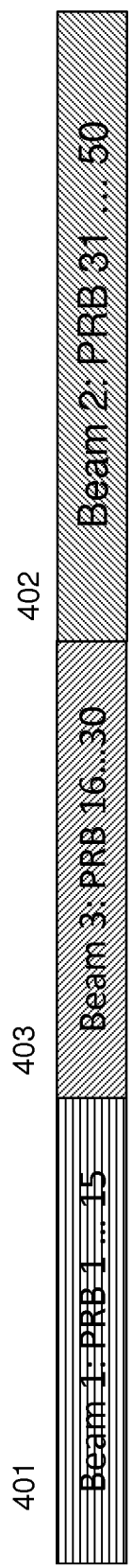
FIG. 4 shows an asymmetric PRB allocation to fixed beams according to an embodiment of the invention.

An example for the allocation in a 10 MHz system is shown in FIG. 4. 15 PRBs (PRBs 1 to 15 and PRBs 16 to 30 denoted by reference signs 401 and 403, respectively) are allocated to each of beams 1 and 3, and 20 resource blocks (PRBs 31 to 50 denoted by reference sign 402) are allocated to beam 2. In this example, beam 2 may be the middle beam.

The approach may be correspondingly adapted to other values of M, even in case of asymmetric PRB allocation. For M=2, either of the fixed beams may get the larger allocation of the resource. If M is even and larger than 2 (M=4, 6, 8, . . . ), one of the two middle beams may have the largest allocation. In general and, in particular if M is larger than 2 (M=3, 4, 5, 6, 7, . . . ), any of the fixed beams not located at the border of the cell (i.e. a middle fixed beam, wherein another fixed beam is spatially located between the middle fixed beam and the border of the cell) may get the larger (largest) allocation.

Figure 5:
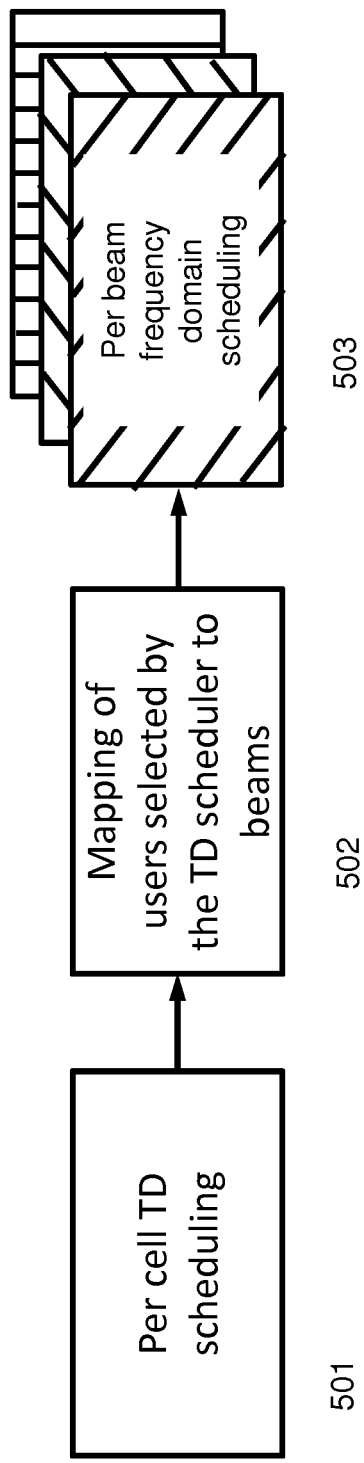
FIG. 5 shows a block diagram of coordinated scheduling/beamforming according to approach 1 of some embodiments of the invention.

In this approach 1, as shown in FIG. 5 by a block diagram of the scheduler concept, the time-domain scheduler 501 is executed as in a legacy approach without beamforming. The time-domain scheduler is extended such that it executes the mapping of the candidate users (terminals, UEs) to the fixed beams, which may be done according to the feedback information received from the UEs or based on measurements of the UL signal of the UEs. Instead of extending the time-domain scheduler, a separate mapping entity 502 may perform the mapping. For each of the beams a separate frequency domain scheduler 503 is executed which allocates the frequency domain resources of all the UEs that are selected for a certain beam within the corresponding frequency range (i.e. the subband coupled to the respective beam).

Figure 6:
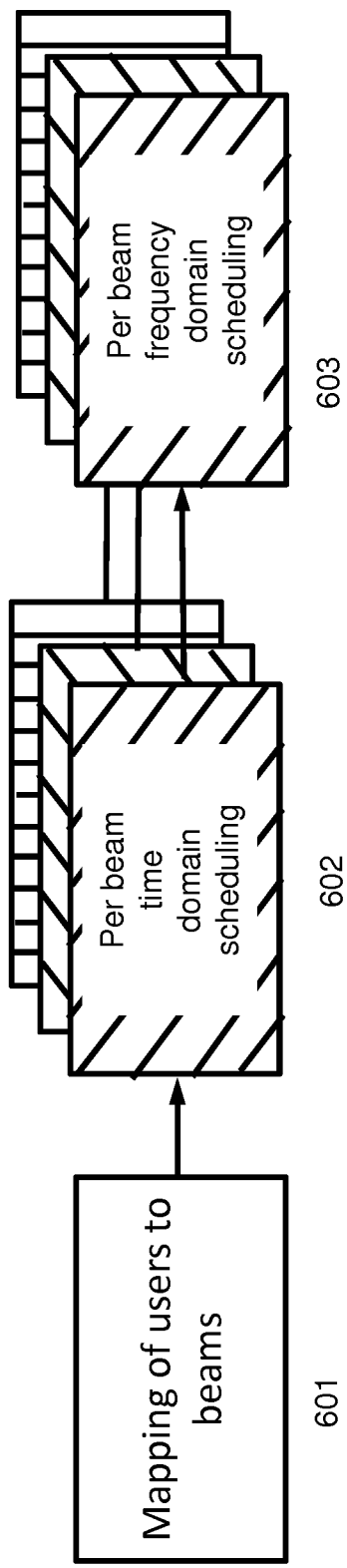
FIG. 6 shows a block diagram of coordinated scheduling/beamforming according to approach 2 of some embodiments of the invention.

Approach 2:

In contrast to approach 1, in approach 2 as shown in FIG. 6 by a block diagram of the scheduler concept, the mapping of users to beams by mapping unit 601 is done before the time-domain scheduling of user per beam by time domain schedulers 602 and subsequent frequency domain scheduling per beam by frequency domain schedulers 603. I.e., the first two steps of approach 1 are interchanged.

Thus, approach 2 realizes a per beam fairness, whereas approach 1 realizes a per cell fairness between UE throughputs.

The coupling of subbands to fixed beams may be the same as according to approach 1.

According to both approaches 1 and 2 it may happen that beams are "empty" because an UE is not allocated to a subset of the fixed beams (e.g. due to the unbalanced spatial UE distribution). Therefore, frequency domain resources may not be allocated and the resources may be wasted. The following approach 3 may avoid this disadvantage.

Figure 7:
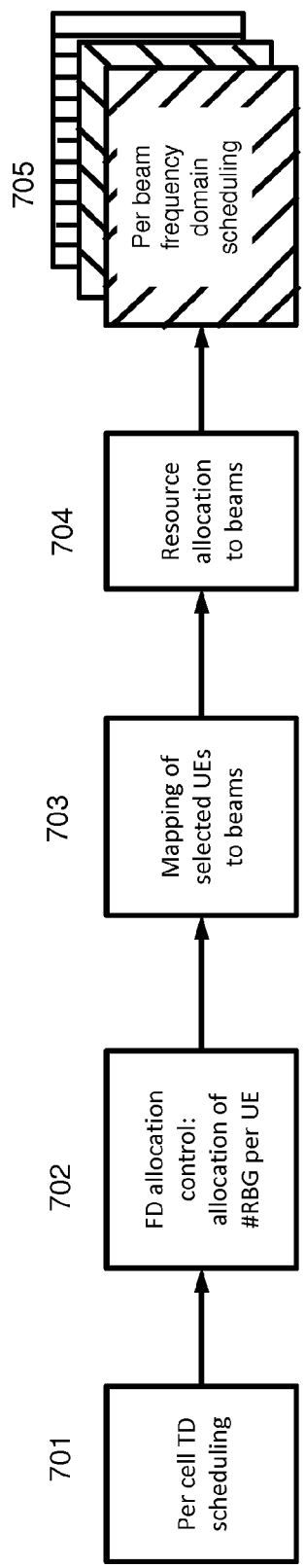
FIG. 7 shows a block diagram of coordinated scheduling/beamforming according to approach 3 of some embodiments of the invention.

Approach 3:

The approach 3 prioritizes full resource usage against optimum interference mitigation. A block diagram of the overall scheduling with coordinated beamforming for this approach 3 is shown in FIG. 7.

The number of resources (RBGs) per UE will be allocated as without coordinated beamforming. In this case, first TD scheduling is performed per cell by TD scheduler 701, and then, FD allocation control is performed by FD allocation unit 702. Accordingly, the resources that are needed for a certain beam is the sum of the resources that have been allocated to the UEs of the certain beam by mapping unit 703.

Figure 8:
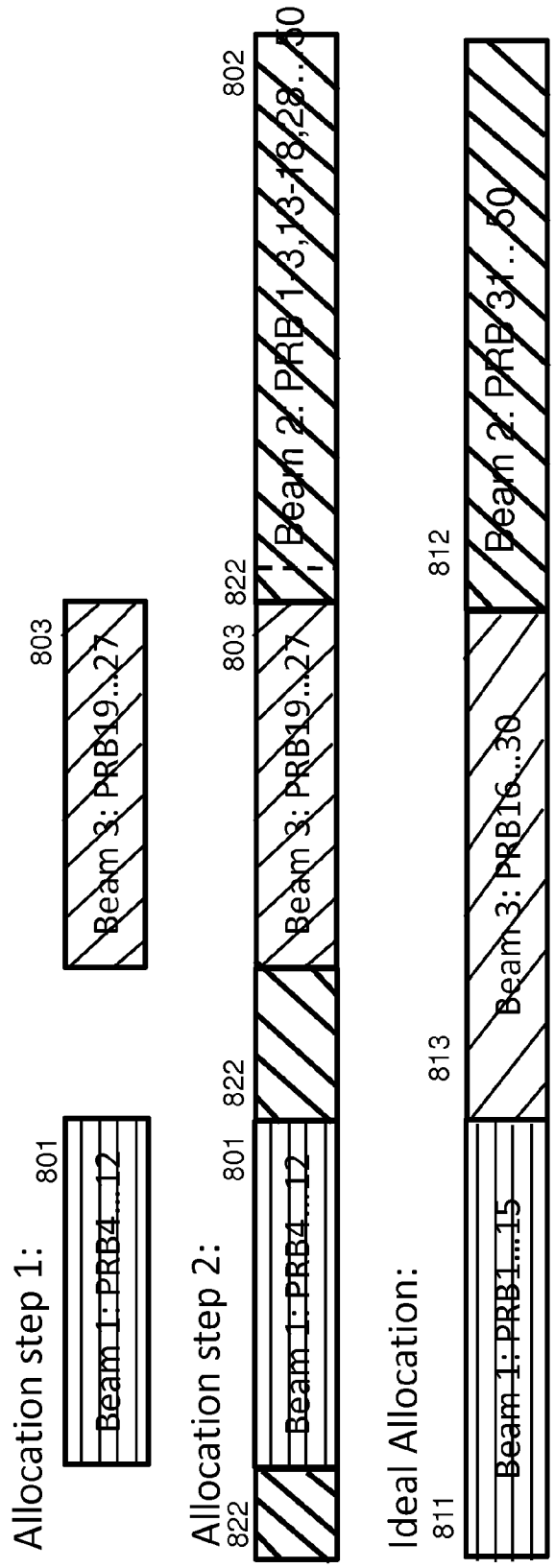
FIG. 8 shows an example of a PRB allocation for approach 3 according to some embodiments of the invention together with a balanced allocation (bottom line)

Then, in a first step performed by resource allocation unit 704, resources of the beams that need less than ⅓ (in general: 1/M) of the total resources (total transmission bandwidth) are allocated (Allocation step 1 in FIG. 8, resulting in allocation 801 for beam 1 and allocation 803 for beam 3). These resources may be located in the center of their respective "balanced allocation", which is defined further below with reference to the last line of FIG. 8.

Then, in a second step by resource allocation unit 704, the other beams are allocated such that each of them occupies its full ⅓ (in general: 1/M) allocation of the total resources (transmission bandwidth). In FIG. 8, this allocation is denoted as 802. In addition, the resource portions 822 not used by the beams coupled in the first step (left over resources) are also allocated to the other beams (Allocation step 2 in FIG. 8). As a consequence, these allocations may be concentrated near the center of the respective balanced allocation, too.

Then, the final PRB allocation to UEs is done separately per beam by FD scheduler 705.

An example resulting allocation is shown in FIG. 8. It is assumed that 16 RBGs comprises three PRBs and one of them comprises two PRBs according to 3GPP specifications for a 10 MHz carrier. In the example, the allocation of RBGs to the beams after initial determination of the number of resources required for the UEs and assigned to the different beams may be e. g. as follows:

Beam 1: 3 RBGs; Beam 2: 11 RBGs; Beam 3: 3 RBGs.

The allocation would then be done as shown in FIG. 8: In allocation step 1, PRBs 4 to 12 (centered around PRB 8 which is the center of "balanced allocated" PRBs 1 to 15, denoted as 801) and PRBs 19 to 27 (centered around PRB 23 which is the center of "balanced allocated" PRBs 16 to 30, denoted as 803) are coupled to fixed beams 1 and 3, respectively. The remaining PRBs 1-3, 13-18, and 28-50 denoted as 822 and 802 are allocated to Beam 2.

In the "balanced allocation", the total bandwidth is divided into M portions of equal size (the "balanced size"), wherein each portion is contiguous. If the bandwidth is allocated with a certain granularity like PRBs or RBGs, the portions should have equal size as much as possible, i.e. in this case, there is a "balanced size" for each of the portions. For example, if the sizes of the allocations cannot be equal in view of the allocation granularity, the "balanced size" of the middle beam may be the allocation with the largest size.

As an example, in the last line of FIG. 8, a possible balanced allocation is shown in comparison. The granularity of allocation is RBG, which is used e.g. in resource allocation type 0. In the example, each RBG (except for one RBG which comprises 2 RBGs) comprises 3 PRBs (according to 3GPP specification of a 10 MHz carrier). Thus, in a balanced allocation, 5 RBGs of 3 PRBs (e.g. PRBs 1 to 15), 5 RBGs of 3 PRBs (e.g. PRBs 16 to 30), and 6 RBGs of 3 PRBs and 1 RBG of 2 PRBs (PRBs 31 to 50) (denoted as allocations 811, 813, and 812, respectively) are allocated to beams 1, 3, and 2, respectively. Note that FIG. 8 is not drawn to scale.

The balanced allocation according to the last line of FIG. 8 may be obtained by the following pseudo-code, wherein the the number of beams is denoted by NoBeams, the number of PRBs by NoPRBs, the size of RBGs by SizeRGBs (for example, the latter may be taken from the RBG table from TS36.213), the (exceptional) reduced RGB size by ReducedRGBSize (calculated below):

Define the vector of allocations in size of PRBs for each beam as AllocationsPRBs(k), k=1 . . . NoBeams as follows:

```
NoRBGs = ceil(NoPRBs/SizeRBGs)
NoRBGsPerBeam = floor(NoRBGs/NoBeams)
ReducedRBGSize = NoPRBs − (NoRBGs−1) * SizeRBGs
AllocationsPRBs(1 ... NoBeams) = NoRBGsPerBeam * SizeRBGs;
DeltaPRBs = NoPRBs − sum over all AllocationsPRBs
while DeltaPRBs > ReducedRBGSize
    NoBeamsToExtend = floor(DeltaPRBs / SizeRBGs)
    MiddleBeamIndex = ceil(NoBeams/2)
    ExtraPRBs = NoPRBs − NoRBGsPerBeam * SizeRBGs * NoBeams
    ExtraPRBsPerBeam = floor(ExtraPRBs / SizeRBGs /
NoBeamsToExtend) * SizeRBGs
    if NoBeamsToExtend > 1
        BeamIndecesToExtend = MiddleBeamIndex−
floor(NoBeamsToExtend/2)+1 ...
MiddleBeamIndex+floor(NoBeamsToExtend/2)
    else
        BeamIndecesToExtend = MiddleBeamIndex;
    end
    for k in BeamIndecesToExtend
        AllocationsPRBs(k) = AllocationsPRBs(k) +
ExtraPRBsPerBeam;
    end
    DeltaPRBs = NoPRBs − sum over all AllocationsPRBs
end
DeltaPRBs = NoPRBs − sum over all AllocationsPRBs
if DeltaPRBs >= ReducedRBGSize
    MiddleBeamIndex = ceil(NoBeams/2);
    AllocationsPRBs(MiddleBeamIndex)  =
AllocationsPRBs(MiddleBeamIndex) + ReducedRBGSize;
end
```

Note that there may be different "balanced allocations" if the bandwidth cannot be divided by the number of beams in view of the granularity used for allocation. For example, the allocations to beams may be interchanged. Also, in the example above, another "balanced allocation" may be 15 PRBs (5 RBGs of 3 PRBs), 17 PRBs (5 RBGs of 3 PRBs and 1 RBG of 2 PRBs), and 18 PRBs (6 RBGs of 3 PRBs) for beams 1, 3, and 2, respectively. In this example, the sum of absolute differences to the "ideally balanced" value of 50/3=16.67 PRBs is minimized, while, according to the former example, the sum of absolute differences is minimized while symmetry of beams 1 and 3 is preserved. Both of these examples may be considered as a "balanced allocation", i.e., in general, the balancing may be performed under several boundary conditions.

The balanced allocation fits in particular well for a symmetric traffic demand. If the traffic demand is not symmetric, the allocations may be adapted according to the needs, as outlined e.g. as Extensions 1 to 5 further below.

The above approaches 1 to 3 of some embodiments of the invention may be considered as cell centric scheduler processing concepts. The overall system concept according to some embodiments of the invention may comprise the extensions described in the following:

Extension 1: Handling of Ambiguous UE PMI Feedback

The mapping of currently defined PMIs from 3GPP Rel.-8 to beams might not be unique. There are in principle two cases:

Case 1: The PMI reporting is not restricted by higher layer signalling. Therefore the UE may report different PMIs/beams for different layers. In this case the scheduler may work in one of the following ways:

Option A: The scheduler takes the UE feedback directly for beamforming; the PRB resource allocation will be for the beam that has the lower load; in other words this could be used to balance the PRB load of the different beams.

Option B: The scheduler selects one of the beams based on PRB load; e.g. it might overrule the UE reporting, therefore, CQI adjustment might be used.

Figure 9:
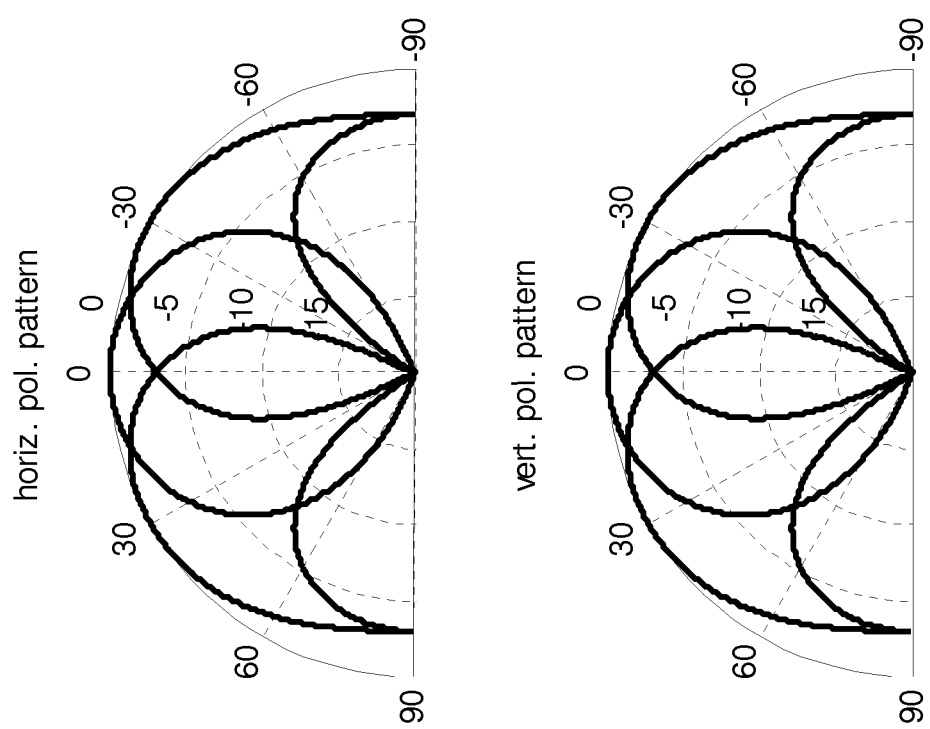
FIG. 9 shows beam forms according to PMIs 1, 7, and 8.

Case 2: The code book is restricted, e.g. by the method of code-book subset restriction, such that the available beams correspond to the chosen subset of PMIs. For example, if there are three fixed beams in a sector, the PMIs may be restricted to PMIs 1, 7, and 8, with ranks 1 or 2. For illustration, FIG. 9 shows the possible beam forms for these PMIs for a horizontal polarization pattern (upper part) and a vertical polarization pattern (lower part).

In case a UE is spatially located between too beams the PMI reporting might be toggling. The beam that shall be selected by the scheduler may then choose the beam that has the lowest traffic load. Some hysteresis may be introduced in order to reduce toggling.

Extension 2: Adaptation of the Number of PRB Allocations to Beams for Approaches 1 and 2

According to this extension, the loading of the beams will be determined periodically and/or at certain occasions (e.g. when the load changes (for example: by more than an absolute or relative threshold value), or at certain events), and the load information will be exchanged between the radio cells in a pre-defined coordination area. Information exchange may be either intra-eNB (which does not require any standardization), inter-eNB (e.g. via X2 with extensions over today's standard; the extensions might be proprietary or standardized), or via a dedicated O&M functionality.

The load may be determined via determination of the composite available capacity (CAC, given in percentage) for cell m and beam n within time t and is denoted by $CAC_{m,n}(t)$. The composite available capacity is defined as in 3GPP TS36.423 on per cell basis. According to Extension 2, a corresponding definition is applied on a per cell and per beam basis, wherein only the users of a certain beam n in cell m are considered.

The PRB allocation will then be adapted for the next time interval t+1 for beam n according to the following formula.

$$\#PRB_n(t+1) = \#PRB \cdot \frac{\left[\sum_m (100 - CAC_{m,n}(t))\right]}{\left[\sum_n \sum_m (100 - CAC_{m,n}(t))\right]}$$

The symbol "#" means "number of", i.e. $\#PRB_n(t+1)$ means number of PRBs of beam n in the next time interval. "#PRB" means "total number of PRBs". In the formula above, numerator is the load in the beam n, denominator is the total load. Then the fraction of PRBs for beam n is total #of PRBs*load in beam n/total load in all beams The new PRB resources may also be lower bounded (i.e. may have a minimum size) to avoid starvation of UEs assigned to this beam. The allocation may be with PRB granularity. In addition, the PRB allocation may have to be mapped to RBG granularity as described earlier, if allocation is made on RBG basis.

Extension 3: Adaptation of PRB Allocations to Beams for Approach 3 in Time Domain According to Extension 3, the allocation of PRB resources is adapted periodically (e.g. every 50 to 100 ms) and/or at certain occasions based on the CAC measurements and is calculated according to the following formula:

$$\#PRB_{m,n}(t+1) = \#PRB \cdot \frac{\lfloor 100 - CAC_{m,n}(t) \rfloor}{\sum_n (100 - CAC_{m,n}(t))}$$

Goal is to keep the interference stable and the allocation of UEs may be adjusted based on UE quality reports leading to adaptive interference shaping.

Extension 4: Smart UE Allocation

This extension will be described with reference to FIG. 10. The method comprises a smart allocation of UEs within the beams based on reported CQIs. According to Extension 4, such an allocation is achieved by proper frequency selective scheduling methods where an UE is allocated to these resources where it experiences the relatively best throughput. FIG. 9 is to be understood schematically only.

Figure 10:
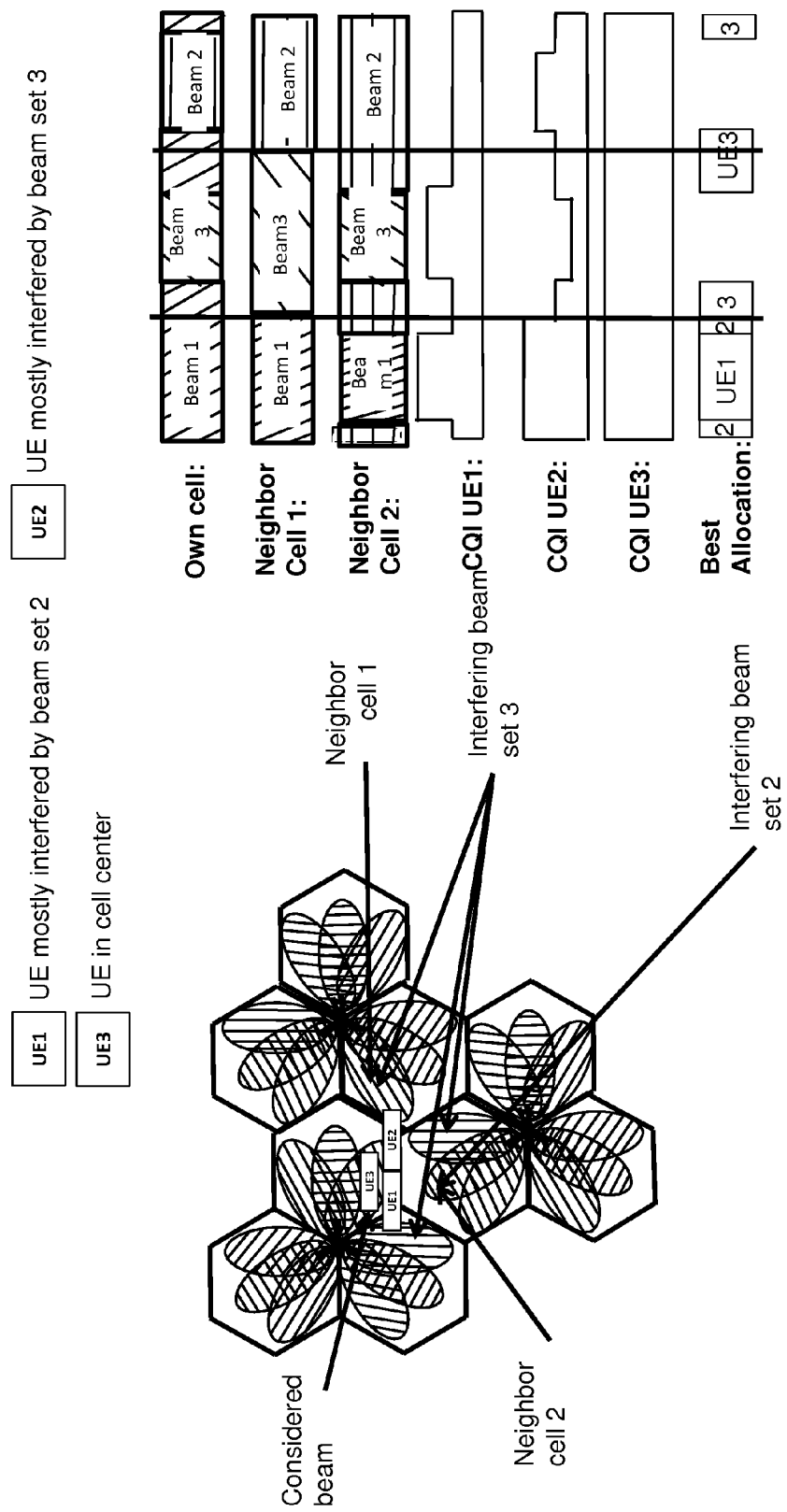
FIG. 10 illustrates Extension 4 according to some embodiments of the invention.

On the left side of FIG. 10, a network comprising base stations according to an embodiment of the invention is shown. Each cell is split into three (in general: M) sectors with corresponding fixed beams. Ideally, different PRBs are allocated to each of the fixed beams, which is shown by different hatching of the ellipses representing the beams. In this example, the balanced allocations of PRBs to beams are the same in all of the cells. The network structure including cells and beams in this example corresponds to that of FIG. 2, such that a more detailed explanation is omitted here.

UE1, UE2, and UE3 are located in the area of a cell of the upper left base station. They are in a sector of the cell served by beam 1. UE3 is in the cell center and hardly affected by interference from other cells. UE1 is closer to the border of the cell, near the area of a beam of another cell (Neighbor cell 2) to which PRBs of a certain frequency area (in this case, the center beam of the three beams per cell, indicated as "Interfering beamset 2") are allocated. UE2 is located near the border of the cell near the areas of several beams to which PRBs of another frequency area (in this case, the first beam if the beams of a cell are counted in a clockwise direction, indicated as "Interfering beamset 3") are allocated. Thus, UE1 and UE2 experience interference from beamset 2 and beamset 3, respectively.

On the right side of FIG. 10, first three lines, beam allocations in the own cell of UE1 to UE3 and neighbor cells 1 and 2 causing interference are shown. On the abscissa, PRBs (frequency) is indicated. The thick vertical lines indicate the balanced allocation of the PRBs to beams. As may be seen from the first three lines, only neighbor cell 1 has an balanced allocation. In the own cell, beam 1 has a larger and non-contiguous frequency area, and beams 2 and 3 have smaller frequency areas. In cell 2, beam 2 has a larger and non-contiguous frequency area, and beams 1 and 3 have smaller frequency areas.

Accordingly, the frequency dependent CQIs of UE1 to UE3 shown in lines 4 to 6 of the right side of FIG. 10 are as follows:

UE1: Due to interference from beam 2 of neighbor cell 2, CQI is low at these frequencies of this beam. In other frequency areas, UE1 is not affected by interference and CQI is high.

UE2: Interference with beam 3 of neighbor cell 1 reduces CQI. In addition, interference with beam 3 of neighbor call 2 reduces CQI even further. Hence, there are three levels of CQI: no interference, interference from one interferer, interference from two interferers.

UE3: Since UE3 is not affected by interference, CQI is high at all frequencies.

In the lowest line on the right side of FIG. 10, a best allocation of resources (PRBs) to UEs is shown. These allocations are such that for UE1 and UE2, only those PRBs of beam 1 are allocated, where the respective CQI is highest. The remaining PRBs allocated to beam 1 of the own cell are allocated to UE3.

Thus, in this example, for all UEs (UE1 to UE3) interference is minimized.

Extension 5: Dynamic Beam Resource Selection

The principles of Extension 5 are as follows:

The resources that are coupled to a fixed beam are also dynamically allocated based on measurements, instead of or in addition to the static approaches described above.

Each beam may use these resources where a UE allocated to this beam experiences the lowest interference from all neighbor cells. This is estimated from the frequency selective CQI reporting of the UEs that indicate PMIs requesting the considered beam.

The M (for example M=3) beams of a cell need to take different PRB areas, i.e., the PRB areas allocated to different fixed beams do not overlap.

There are many options differing in which exact metric to consider, which UEs to consider, which resources to consider and how frequent to adapt the allocation.

A list of some options and possible choices which the scheduler may take into account based on UE reporting (CQI) or scheduler measurements (rate) is given below as examples:

Metric options:
  CQI (considered PRBs)
  CQI (considered PRBs)—Wideband CQI (simple and should give quite similar results as if we would use the rate criteria below)
  Rate (considered PRBs)
  Rate (considered PRBs)/average UE rate (for non GBR)
  Rate (considered PRBs)/UE rate according to wideband CQI (for GBR)

Options for selection of UEs:
  All UEs that deliver a CQI report
  UEs eligible for scheduling, i.e., have data in buffer and are not in DRX sleep . . . , update in every TTI
  UEs selected by TD scheduler, update when the UEs are scheduled (simple and should give higher impact to UEs with high needs)

Options for the PRB allocation:
  Only the 6 PRBs located in the center of a resource area (e.g. PRBs 7-12, 19-25, 37-42)->simplest scheme, might not be optimum
  The whole balanced resource area
  The number of PRBs that is used by the beam in the preferred area
  The number of PRBs that are used by the considered beam Options for the selection of the averaging time/update rate:
  All measures need to be filtered by a first order filter (as normally)
  Resource allocation can be updated continuously (when the new metric becomes better than the old one)->simple and also used with interference aware scheduler
  An additional hysteresis might be applied to avoid too frequent changes
  A periodic update (e.g., every 500 ms) can be used Static configurations of fixed beams and allocated PRBs may be managed by O&M or a separate control device. In case of dynamics, the settings may be controlled by a control unit such as the base station itself, a component thereof, O&M, or a separate control device. In these cases, the control unit needs to have information on the parameter values on which the dynamic settings are based. Therefore, in some cases, base station has to provide an appropriate interface.

In some embodiments of the invention, multiple terminals (users) may be scheduled in the same TTI and the same frequency resources ("shared frequency resources") but in different beams. Each of the terminals may not use the shared frequency resources only but, additionally, it may use further frequency resources. That is, the frequency resources used by different terminals may overlap at the shared frequency resources. For example, UE1 may use beam 1 in cell 1 on resources 5-12 whereas UE2 may use resources 5-7 in beam 3 in cell 1 and UE3 may use resources 8-9 in beam 3 of cell 1. So, the two UEs that use the same PRB/TTI in a cell (e.g. UE1 and UE2, or UE1 and UE3) use different beams. Compared to conventional multi-user MIMO transmission, for example additional interference mitigation between the cells may be achieved.

Figure 12:
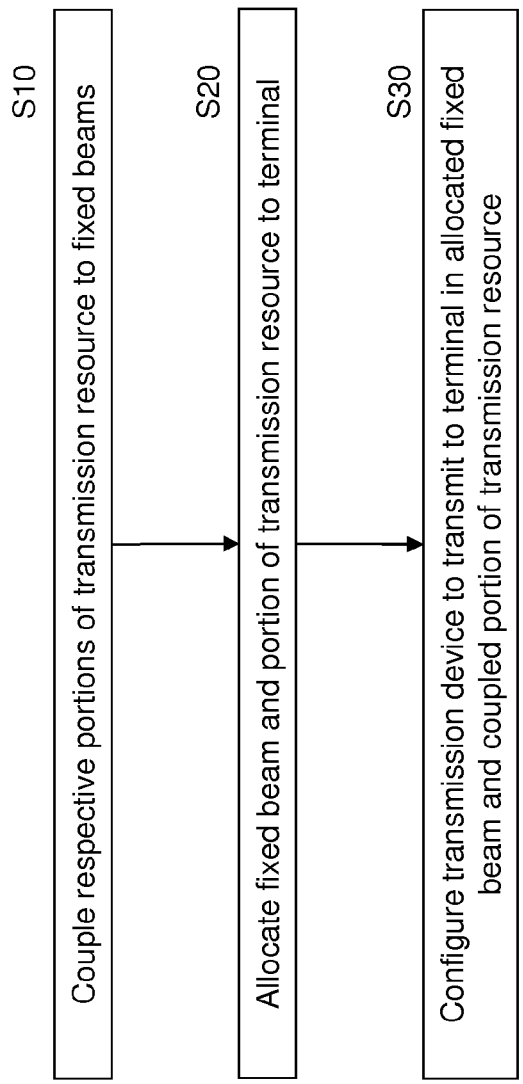
FIG. 12 shows a method according to an embodiment of the invention.
Figure 11:
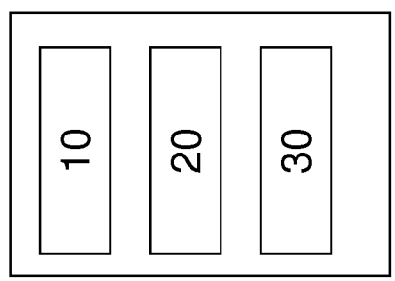
FIG. 11 shows an apparatus according to an embodiment of the invention.

FIG. 11 shows an apparatus according to an embodiment of the invention. The apparatus may be a base station such as an eNodeB or NodeB, or an element thereof. FIG. 12 shows a method according to an embodiment of the invention. The apparatus according to FIG. 11 may perform the method of FIG. 12 but is not limited to this method. The method of FIG. 11 may be performed by the apparatus of FIG. 11 but is not limited to being performed by this apparatus.

In FIG. 11, the apparatus comprises coupling means 10, allocating means 20, and configuring means 30.

The coupling means 10 couples respective portions of a transmission resource to fixed beams in a 1:1 relationship (S10). That is, each of the portions of the transmission resource is coupled to one fixed beam, and each of the fixed beams is coupled to one portion of the transmission resource. The coupling is such that the portions coupled to different fixed beams do not overlap. Each of the fixed beams is defined by a fixed beam weight vector, and a number M of the fixed beams is predefined and equal to or larger than 2 (M=2, 3, 4, . . . ).

The transmission resource is foreseen for transmission by the cell. It may be a transmission bandwidth and each of the portions may be a subband. Alternatively or in addition, the transmission resource may be a transmission time frame and each of the portions may be a subframe. The assignment and the coupling may be such that interference to other cells is minimized.

The allocating means 20 allocates one of the fixed beams and the portion of the transmission resource coupled to the one of the fixed beams to a terminal (S20). The terminal may be a UE.

The configuring means 30 configures a transmitting device to transmit to the terminal in the fixed beam and its coupled portion of the transmission resource allocated to the terminal (S30). The transmitting device may be a transceiver of a base station.

Figure 13:
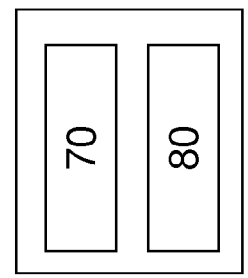
FIG. 13 shows an apparatus according to an embodiment of the invention.

FIG. 13 shows an apparatus according to an embodiment of the invention. The apparatus comprises at least one processor 70, at least one memory 80 including computer program code, and the at least one processor, with the at least one memory and the computer program code, being arranged to cause the apparatus to at least perform at least one of the methods according to FIG. 12.

In the description hereinabove, different subbands were considered to avoid collisions of beams. I.e., the available transmission bandwidth was split into different subbands. Alternatively, according to some embodiments of the invention, the resources are separated in time using M different subframes. According to some embodiments of the invention, the resources are separated in both frequency and time. That is, in general, the separation may be done in each dimension of a resource block. For example, in 3GPP networks, resource blocks are defined as a portion of a bandwidth and a time slot. In other network technologies, a resource may be defined e.g. by a code space. The approach to split the transmission bandwidth into subbands is assumed to be the most flexible approach.

Embodiments of the invention may be employed in a 3GPP network such as a LTE or an LTE-A network. They may be employed also in other mobile networks enabling multiple data paths such as CDMA, EDGE, UMTS, Wi-Fi networks, etc.

A terminal may be any device capable to be connected to the radio access network, such as a UE, a laptop, a tablet, a smartphone, a communicator, a machine, a robot, a wearable, etc.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality. The functionality may be integral to one or few of the network elements or it may be shared or distributed among the network elements, or their cloud.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

According to the above description, it should thus be apparent that example embodiments of the present invention provide, for example a base station such as a NodeB or eNodeB, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:
1. An apparatus comprising:
at least one memory including computer program code; and at least one processor, wherein the at least one processor, with the at least one memory and the computer program code, are arranged to cause the apparatus to perform operations comprising:
coupling respective portions of a transmission resource to fixed beams in a 1:1 relationship such that the portions coupled to different fixed beams do not overlap, wherein the transmission resource is foreseen for transmission by the cell, each of the fixed beams is defined by a fixed beam weight vector, and a number of the fixed beams is predefined and equal to or larger than 2;
allocating one of the fixed beams and the portion of the transmission resource coupled to the one of the fixed beams to a terminal; and
configuring a transmitting device to transmit to the terminal in the fixed beam and the portion of the transmission resource allocated to the terminal, wherein coupling performs at least one of the following operations:
coupling the portions of the transmission resource and fixed beams based on a received information about neighbor portions of the transmission resource coupled to neighbor fixed beams of a neighboring cell such that mutual interference with the neighboring cell is minimized;
coupling a largest one of the portions to a middle beam of the fixed beams, wherein at least one of the other fixed beams is spatially located between the middle beam and a border of the cell; and
coupling the respective portion of the transmission resource to the respective fixed beam based on measurement related to interference and/or data rates of UEs.

2. The apparatus according to claim 1, wherein the at least one processor, with the at least one memory and the computer program code, are further arranged to cause the apparatus to at least perform operations comprising:
informing a control device about the fixed beams and their coupled portions of the transmission resource.

3. The apparatus according to claim 2, wherein the control device is comprised by one of an operation and maintenance center and a base station not comprising the apparatus.

4. The apparatus according to claim 1, wherein the transmission resource is at least one of a transmission bandwidth and the portion is a subband, and a transmission time frame and the portion is a subframe.

5. The apparatus according to claim 1, wherein the at least one processor, with the at least one memory and the computer program code, are further arranged to cause the apparatus to at least perform operations comprising at least one of the following:
defining the respective portions of the transmission resource based on at least one of load information of the cell, load information of a neighbor cell neighbored to the cell, and load information of the respective fixed beam; and
defining the respective portions of the transmission resource based on a feedback report received from the terminal.

6. The apparatus according to claim 1, wherein the at least one processor, with the at least one memory and the computer program code, are further arranged to cause the apparatus to at least perform operations comprising one of the following:
scheduling a time for the a transmission to the terminal before the terminal is allocated to the one of the fixed beams; and scheduling a time for the transmission to the terminal after the terminal is allocated to the one of the fixed beams.

7. The apparatus according to claim 1, wherein the at least one processor, with the at least one memory and the computer program code, are further arranged to cause the apparatus to at least perform operations comprising:
monitoring required sizes of the portions of the transmission resource required for the transmission to terminals for each of the fixed beams;
comparing, for each of the fixed beams, the required size with a respective balanced size of the portion,
wherein the allocating is configured to allocate a portion of the required size to each of the fixed beams where the required size is equal to or less than the respective balanced size, and to allocate the remaining part of the transmission resource to the fixed beams where the required size is larger than the respective balanced size.

8. The apparatus according to claim 1, wherein the at least one processor, with the at least one memory and the computer program code, are further arranged to cause the apparatus to at least perform operations comprising:
scheduling a time for respective transmissions to plural terminals,
wherein the allocating allocates respective fixed beams and the coupled portion of the transmission resource to the plural terminals, wherein the coupled portion is the same for each of the plural terminals.

9. A method comprising:
coupling respective portions of a transmission resource to fixed beams in a 1:1 relationship such that the portions coupled to different fixed beams do not overlap, wherein the transmission resource is foreseen for transmission by the cell, each of the fixed beams is defined by a fixed beam weight vector, and a number of the fixed beams is predefined and equal to or larger than 2;
allocating one of the fixed beams and the portion of the transmission resource coupled to the one of the fixed beams to a terminal; and
configuring a transmitting device to transmit to the terminal in the fixed beam and the portion of the transmission resource allocated to the terminal, wherein
the coupling is configured to couple the portions of the transmission resource and fixed beams based on a received information about neighbor portions of the transmission resource coupled to neighbor fixed beams of a neighboring cell such that mutual interference with the neighboring cell is minimized;
the coupling is configured to couple a largest one of the portions to a middle beam of the fixed beams, wherein at least one of the other fixed beams is spatially located between the middle beam and a border of the cell; and
the coupling is configured to couple the respective portion of the transmission resource to the respective fixed beam based on measurement related to interference and/or data rates of UEs.

10. The method according to claim 9, further comprising:
informing a control device about the fixed beams and their coupled portions of the transmission resource.

11. The method according to claim 10, wherein the control device is comprised by one of an operation and maintenance center and a base station not comprising an apparatus performing the method.

12. The method according to claim 9, wherein the transmission resource is at least one of a transmission bandwidth and the portion is a subband, and a transmission time frame and the portion is a subframe.

13. The method according to claim 9, further comprising at least one of:
defining the respective portions of the transmission resource based on at least one of load information of the cell, load information of a neighbor cell neighbored to the cell, and load information of the respective fixed beam; and
defining the respective portions of the transmission resource based on a feedback report received from the terminal.

14. The method according to claim 9, further comprising one of:
scheduling a time for a transmission to the terminal before the terminal is allocated to the one of the fixed beams; and
scheduling a time for the transmission to the terminal after the terminal is allocated to the one of the fixed beams.

15. The method according to claim 9, further comprising:
monitoring required sizes of the portions of the transmission resource required for the transmission to terminals for each of the fixed beams;
comparing, for each of the fixed beams, the required size with a respective balanced size of the portion,
wherein the allocating is configured to allocate a portion of the required size to each of the fixed beams where the required size is equal to or less than the respective balanced size, and to allocate the remaining part of the transmission resource to the fixed beams where the required size is larger than the respective balanced size.

16. The method according to claim 9, further comprising:
scheduling a time for respective transmissions to plural terminals,
wherein the allocating is configured to allocate respective fixed beams and the coupled portion of the transmission resource to the plural terminals, wherein the coupled portion is the same for each of the plural terminals.

17. A computer program product comprising a non-transitory computer readable medium comprising a set of instructions which, when executed on an apparatus, is configured to cause the apparatus to carry out operations comprising:
coupling respective portions of a transmission resource to fixed beams in a 1:1 relationship such that the portions coupled to different fixed beams do not overlap, wherein the transmission resource is foreseen for transmission by the cell, each of the fixed beams is defined by a fixed beam weight vector, and a number of the fixed beams is predefined and equal to or larger than 2;
allocating one of the fixed beams and the portion of the transmission resource coupled to the one of the fixed beams to a terminal; and
configuring a transmitting device to transmit to the terminal in the fixed beam and the portion of the transmission resource allocated to the terminal, wherein
the coupling is configured to couple the portions of the transmission resource and fixed beams based on a received information about neighbor portions of the transmission resource coupled to neighbor fixed beams of a neighboring cell such that mutual interference with the neighboring cell is minimized;
the coupling is configured to couple a largest one of the portions to a middle beam of the fixed beams, wherein at least one of the other fixed beams is spatially located between the middle beam and a border of the cell; and
the coupling is configured to couple the respective portion of the transmission resource to the respective fixed beam based on measurement related to interference and/or data rates of UEs.

* * * * *

UNITED STATES PATENT AND TRADEMARK OFFICE
CERTIFICATE OF CORRECTION

PATENT NO. : 10,333,601 B2
APPLICATION NO. : 15/516213
DATED : June 25, 2019
INVENTOR(S) : Markus Reinhardt, Hans Kroener and Wolfgang Payer Page 1 of 1

It is certified that error appears in the above-identified patent and that said Letters Patent is hereby corrected as shown below:

In the Claims

In Claim 6:
Column 17, Line 65, "for the" should be deleted and --for-- should be inserted.

Signed and Sealed this
Twentieth Day of August, 2019

Andrei Iancu
*Director of the United States Patent and Trademark Office*